US007266539B2

(12) United States Patent
Berks et al.

(10) Patent No.: US 7,266,539 B2
(45) Date of Patent: Sep. 4, 2007

(54) MANAGING ATTRIBUTED-TAGGED INDEX ENTRIES

(75) Inventors: Robert T. Berks, Auckland (NZ); Miroslaw A. Flasza, Pickering (CA); Matthew A. Huras, Ajax (CA); Leo T. M. Lau, Richmond Hill (CA); Catherine S. McArthur, Uxbridge (CA); David Tremaine, Thornhill (CA); Gary Valentin, Tel-Aviv (IL); Michael J. Winer, Markham (CA)

(73) Assignee: International Business Machines Corporation, Armonk, NY (US)

( * ) Notice: Subject to any disclaimer, the term of this patent is extended or adjusted under 35 U.S.C. 154(b) by 449 days.

(21) Appl. No.: 10/421,178

(22) Filed: Apr. 22, 2003

(65) Prior Publication Data

US 2003/0204486 A1   Oct. 30, 2003

(30) Foreign Application Priority Data

Apr. 26, 2002   (CA)   ................................ 2383713

(51) Int. Cl.
*G06F 17/30* (2006.01)
(52) U.S. Cl. .............................................. 707/1; 707/2
(58) Field of Classification Search ................ 700/100; 707/200, 2, 1
See application file for complete search history.

(56) References Cited

U.S. PATENT DOCUMENTS

| 4,914,569 | A | | 4/1990 | Levine et al. |
|---|---|---|---|---|
| 5,495,609 | A | * | 2/1996 | Scott .............................. 707/8 |
| 5,497,485 | A | | 3/1996 | Ferguson et al. |
| 5,664,184 | A | | 9/1997 | Ferguson et al. |
| 5,680,607 | A | * | 10/1997 | Brueckheimer ................ 707/7 |
| 6,154,746 | A | | 11/2000 | Berchtold et al. |
| 6,205,453 | B1 | * | 3/2001 | Tucker et al. ................ 715/503 |
| 6,457,021 | B1 | * | 9/2002 | Berkowitz et al. .......... 707/201 |

OTHER PUBLICATIONS

Boeing Scientific Research Laboratories Document 01-82-0989, Jul. 1970, "Organization and Maintenance of Large Ordered Indices", R. Bayer and E. McCreight.
IBM Technical Disclosure Bulletin, vol. 37, No. 12, Dec. 1994, Rapid Detection of Indexs Key Insertion Patterns, R.D. Dean, S.D. Helt and G. R. Ricard (pp. 569-571).
IEEE Computer Society Press, Los Alamitos, California, Third International Workshop on Real-Time Computing Systems and Applications, Oct. 30-Nov. 1, 1996, Seoul, Korea.

* cited by examiner

*Primary Examiner*—Apu Mofiz
*Assistant Examiner*—Monica Pyo
(74) *Attorney, Agent, or Firm*—Sawyer Law Group LLP (57) ABSTRACT

The invention herein provides method and apparatus for managing attribute-tagged index entries contained in an index by assigning or tagging an index entry attribute indicator to a newly inserted index entry (that is, at the time when a key data value is inserted into the index, the key data value becomes a newly inserted index entry and an attribute indicator is tagged to the newly inserted index entry). The index entry can be placed anywhere within the index. Once a group of attribute-tagged index entries have been inserted into the index, the attribute identifiers can be switched off instantaneously (that is, the attribute associated with the attribute indicators is disabled).

33 Claims, 5 Drawing Sheets

MANAGING ATTRIBUTED-TAGGED INDEX ENTRIES

CROSS REFERENCE TO RELATED APPLICATIONS

This application claims benefit under 35 USC 119 of Canadian Application 2,383,713 filed on Apr. 26, 2002.

FIELD OF THE INVENTION

The present invention generally relates to managing index entries. More particularly, the present invention relates to managing attribute-tagged index entries.

BACKGROUND OF THE INVENTION

Known database management systems (DBMS) provide index management by grouping key data values (to be inserted in the index) with an attribute identifier, and the key data values are then placed in a separate or secondary index apart or separate from the index having pre-existing index entries. The attribute identifier identifies an attribute or property that is associated with the key data values inserted into the secondary index. Key data values (inserted or grouped separately in the separate index) are associated with the attribute. When the attribute is revoked (disabled) for all members of the separate index, an operation for performing an overall update of the index is required. The update operation performed by the DBMS includes an index merge operation, in which the DBMS merges the index and the separate index together into an updated index. This is somewhat analogous to merging two separate stacks of playing cards into a new pile of playing cards. The index merge operation, sometimes referred to as an incremental maintenance operation, disadvantageously requires significant amounts of time and resources for merging the separate indexes together.

Accordingly, a solution that addresses, at least in part, these and other shortcomings is desirable.

SUMMARY OF THE INVENTION

The invention herein provides method and apparatus for managing attribute-tagged index entries contained in an index by assigning or tagging an index entry attribute indicator to a newly inserted index entry (that is, at the time when a key data value is inserted into the index, the key data value becomes a newly inserted index entry and an attribute indicator is tagged to the newly inserted index entry). The index entry can be placed anywhere within the index. Once a group of attribute-tagged index entries have been inserted into the index, the attribute identifiers can be switched off instantaneously (that is, the attribute associated with the attribute indicators is disabled). For example, an attribute identifier can be used to defer accessibility of appropriately attribute-tagged index entries until a predetermined time later when the attribute can be disabled and thus allow users to access the attribute-tagged index entries without having to remove the attribute indicators from the index.

In an aspect of the present invention, there is provided a method for use in a data processing system for managing an index containing index entries, including tagging an attribute identifier for identifying an index entry attribute to each one of a subset of index entries contained in the index.

In another aspect of the present invention, there is provided a computer program product for implementing the method as described in the previous paragraph.

In yet another aspect of the present invention, there is provided a data processing system including computer readable memory operatively coupled to the data processing system, and a module for managing an index containing index entries, the module stored in the computer readable memory, the module includes program code for directing the data processing system to tag an attribute identifier to each one of a subset of index entries contained in the index, the attribute identifier for identifying an index entry attribute.

In yet another aspect of the present invention, there is provided a computer program product for implementing the data processing system as described in the previous paragraph.

A better understanding of these and other aspects of the invention can be obtained with reference to the following drawings and description of the preferred embodiments.

DETAILED DESCRIPTION

The invention provides a system for managing attribute-tagged index entries contained in an index by assigning or tagging an index entry attribute indicator to a newly inserted index entry (that is, at the time when a key data value is inserted into the index, the key data value becomes a newly inserted index entry and an attribute indicator is tagged to the newly inserted index entry). The attribute-tagged index entry can be placed anywhere within the index. Once a group of attribute-tagged index entries have been inserted into the index, the attribute identifiers can be switched off instantaneously (that is, the attribute associated with the attribute indicators is disabled). For example, an attribute identifier can be used to defer accessibility of appropriately attribute-tagged index entries until a predetermined time later when the attribute indicators can be disabled and thus allowing users to access the attribute-tagged index entries (without having to remove the attribute indicators from the index). Advantageously, the present invention also provides operation for globally switching off (that is, globally disabling) an attribute associated with all attribute-tagged index entries.

Key data values can also be inserted into target pages associated with an index (for example, a B-tree index). The target pages are portions or sections of the index. Access to existing (previously inserted) index entries is maintained. However, access to attribute-tagged index entries (inserted in various pages of the index) can be restricted. Access to all attribute-tagged index entries can be disabled en mass at a later time (that is, a deferred update of the index in which access is permitted to all index entries once the update operation is complete).

An index entry is a key (sometimes known as a 'key data value') which has been inserted into an index. An index entry attribute indicator can be tagged to (or associated with) the index entry. The index attribute indicator indicates an attribute or property associated with the index entry which is tagged with the index attribute identifier. An example of an index entry attribute is 'visibility' or 'invisibility' (sometimes referred to as 'user accessibility' or 'user inaccessibility') of attribute-tagged index entries. The present invention is not limited to any specific type of attribute that can be associated with an index entry attribute identifier. Another example of a type of attribute that can be associated with an index entry attribute indicator is 'committedness'. An index entry is considered 'committed' if the index entry has been inserted into the index by a transaction, and that transaction has completed (that is, the transaction has 'committed'). A transaction involves a unit of work, and that unit of work may handle one or more units of data. For example, if an SQL insert statement (a transaction) was performed for inserting a single unit of data and once the SQL insert statement has ended operation, the transaction would 'commit'. Some transactions involve inserting a group of keys into an index. Once that group of keys has been inserted, the inserted keys are 'committed'. Embodiments of the present invention provide methods or means for tagging index entries with many types of index entry attribute indicators.

An advantage for restricting access (visibility) to key data values which are newly inserted into an index is to defer an integrity validation process for all newly inserted index entries at a more convenient time. For example, validation can be performed in a batch mode (that is, all newly inserted data key values are validated in a single operation) at a user selected point in time. This advantage can be used to ensure the repeatable read isolation level semantics in applications that concurrently access the index. Making all attribute-tagged key data values accessible (that is, making all attribute-tagged index entries visible at the same time by disabling the attribution of the attribution indicators) does not require modification to the index or modification of the content of the index, which reduces processing time needed to bring the newly inserted index entries on-line (in sharp contrast to the index merge operation provided by known data base management systems). Since the present invention does not require locking of newly inserted index entries, the limit of concurrency of other applications that access the index in read mode is not limited. The present invention enables independent insertion of key data values by many applications. The present invention does not require additional temporary storage, and does not require merging of separate index structures to materialize (make visible or make accessible) newly inserted key data values (index entries). For example, the present invention can be used in a bulk loader utility in which read access to a table and its index is maintained while bulk insertion of index key data values is performed.

Figure 1:
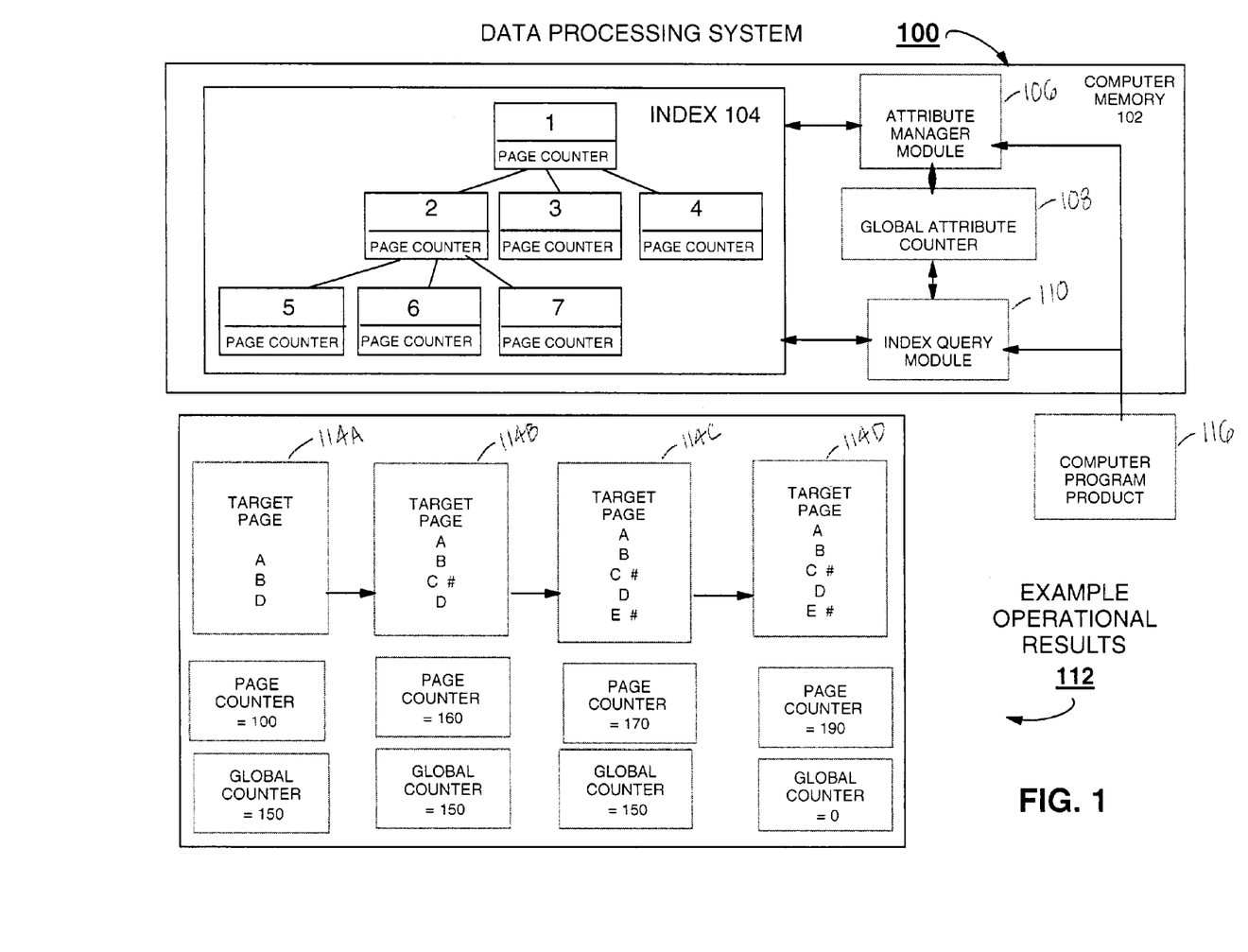
FIG. 1 depicts a data processing system having an attribute manager module and an index query module.

FIG. 1 shows a data processing system 100 including computer memory 102 operatively coupled to a central processing unit (CPU—not depicted). Stored in computer memory 102 is an index 104. It will be appreciated that the index 104 may be structured, sectioned, or organized into pages (that is, portions or sections of the index). Also stored in computer memory 102 is an attribute manager module 106, a global attribute counter 108, and an index query module 110.

Attribute manager module 106 includes computer programmed instructions or code for directing a CPU to perform operations which are described in greater detail with reference to FIGS. 2, 3, and 4. The attribute manager module 106 provides code for directing the CPU or the data processing system to manage an index containing index entries, such as code for tagging an attribute identifier to an index entry contained in the index. The attribute identifier identifies an index entry attribute.

Index query module 110 includes computer programmed instructions or code for directing the CPU to perform operations which are described in greater detail with reference to FIG. 5. It will be appreciated that attribute manager module 106 and the index query module 110 can be combined into one unitary module or can remain as separate modules. Computer program product 116 includes computer readable media for storing computer programmed instructions having code for implementing the operation provided by the attribute manager module 106 and the index query module 110 either in combination or individually. It will also be appreciated that the attribute manager module 106 and the index query module 110 can be included individually or in combination with another computer program product (not depicted), such as a database management system (DBMS), which would enable the computer program product to perform the operations provided by the attribute manager module 106 and the index query module 110. Alternatively, the index query module 110 and the attribute manager module 106 can be transferred via a network to a data processing system operatively connected to the network (such as the Internet), and the network signaling system is used as the media for transporting modules 106 and 110 for operative storage in the data processing system. The computer readable media may be, for example, a disk, a tape, a removable memory chip, or a file downloaded from a remote source.

An index 104 includes pages or index portions numbered from 1 to 7 inclusively. Each page of the index includes an associated or corresponding page change counter (hereinafter referred to as a page counter). It will be appreciated that a page change counter can also be called an index section indicator which indicates changes made to a section of an index. Whenever a key data value is inserted into a page of the index, a corresponding page counter (which corresponds to the associated page in which the insertion of the key data value had occurred) is incremented. Page counters are well known in the art and can be implemented as a log sequence counter for containing a log sequence number. The page counter is a counter which contains a value that increases each time the corresponding page is processed (such as when a key is inserted into the page).

A global attribute counter 108 is used for determining a current attribute status for all attribute-tagged index entries. There is one global attribute counter that is associated with one type of attribute indicator. It will be appreciated that many global attribute counters can be used for enabling/disabling particular groups of attribute-tagged key entries (regardless of the particular placement of the attribute-tagged index entries within an index). It will be appreciated that the global attribute counter can also be called an attribute disable indicator for indicating whether the attribute-tagged index entries are disabled with respect to their attribute. The current attribute status can indicate, for example, the accessibility of key data values which were newly inserted into an index. The purpose of the global attribute counter 108 is to provide an indication for enabling or disabling the current attribute status. For example, if the value in the global attribute counter 108 is less than or equal to the value in a page counter value associated with a page of an index, the attribute status is enabled (that is for example, access to attribute-tagged index entries is restricted, and the attribute-tagged index entries remain 'invisible' or not accessible). For example, if the value of the global attribute counter 108 is greater than the value of the page counter, the attribute status is disabled for that page (that is for example, access to attribute-tagged index entries is not restricted, and the attribute-tagged index entries become visible).

A zero value in the global attribute counter 108 indicates that there is no special processing of any attribute-tagged index entries, that is, all attributes associated with the global counter are disabled. If the global attribute counter 108 is set to a non-zero value, the global attribute counter 108 is used by comparing its value against a value contained in the page counter associated with a target page so that a determination can be made, for example, to permit access to attribute-tagged index entries. When the index 104 includes portions or pages of the index, the global attribute counter 108 is used in combination with the attribute indicators to determine whether attribute-tagged index entries are enabled or disabled with an attribute status. By changing the value contained in the global counter 108, groups of attribute-tagged index entries can either have or not have the attribute associated with them. Generally, when the page counter value is greater than (or equal to) the global attribute counter, attribute-tagged index entries have the attribute associated with the attribute indicator. For example, the attribute indicator might indicate whether the accessibility of the attribute-tagged index entry to other programs that scan the index to look for index entries.

Referring back to FIG. 1, example operational results 112 shows examples of target page '5' included in an index 104 at various moments in time, such as target pages 114A, 114B, 114C, and 114D. It is understood that target pages 114A, 114B, 114C, 114D are just labels for purposes of illustration. These labels refer to the same target page which may exist at different times. Target page 114A includes existing index entries 'A', 'B', and 'D'. All index entries of target page 114A are accessible by all users. For target page 114A, global attribute counter 108 is set to a value of '150', and a page counter value associated with the target page 114A is set to a value of '100'. Apart from the special case when the global attribute counter 108 is set to zero, the global attribute counter 108 is initially set to a value larger than any current value of any page counter. Target page 114B includes a newly inserted index entry 'C' along with existing index entries 'A', 'B', and 'D'. The newly inserted index entry 'C' is tagged or flagged by an attribute indicator '#' (such as a flag) for indicating that the newly inserted index entry 'C' is accessible only to a user who inserted the newly inserted index entry; however, the newly inserted index entry is not accessible to other users. For target page 114B, the global attribute counter 108 remains at a value of '150', and the page counter value associated with the target page 114B is set to a value of '160' (because a new index entry was inserted in to the target page). The incrementing of the page counter happens as part of the key insertion algorithm. Target page 114C includes another newly inserted index entry 'E' which is also tagged with an attribute indicator '#'. For target page 114C, global attribute counter 108 remains at a value of '150', and the page counter value associated with the target page 114C is set to a value of '170' (because another index entry was inserted into the target page). For target page 114D, the global attribute counter was set to zero which disables the attribute status of attribute indicators '#', and thus the attribute-tagged index entries are now accessible to all users. The attribute indicators were not removed from the target pages, nor were they untagged from their respective index entries. The attribute indicators '#' may remain in target page 114D. The attribute indicators do not need to be removed from the target page for the index entries to become visible or accessible. The attribute indictors can be cleaned up when the page is updated at a later time. For target page 114D, global attribute counter 108 is set to a zero value, and the page counter value associated with the target page 114D is set to a value of '190'.

An attribute manager module 106 provides code for enabling access to attribute-tagged index entries so that other users (such as index scanners) may access the attribute-tagged index entries. The attribute-tagged index entries can be made visible instantaneously at any selected point in time by setting the value of the global counter relative to the value set in the page counter.

In a preferred embodiment, attribute indicators are tagged to their respective index entry (in which the attribute indicators indicate that a property such as the index entry is 'pseudo-inserted'—that is, inserted but not generally available). A page counter for each page increases as the page of the index is touched or processed. A global attribute counter is used for enabling/disabling all attribute-tagged index entries contained in the index. Newly inserted index entries are flagged; in the following example embodiment they are flagged as 'pseudo-inserted'. If the index entry is pseudo-inserted and the page counter of the page is greater than or equal to the global attribute counter (if the global counter is not the special case zero), the attribute-tagged index entry is treated as invisible. Otherwise, the attribute-tagged index entry is treated as visible. By choosing the value of the global attribute counter, the visibility of the attribute-tagged index entry may be manipulated. The instant materialization (that is, making all attribute-tagged indicators accessible or visible) of all attribute-tagged index entries is accomplished by setting the global attribute counter to a zero value or by setting the global counter to a higher value than all page counters.

'Committedness' is another example of an attribute or property that can be tagged to an index entry. By using another global attribute counter that is dedicated for managing a 'committedness' attribute, the operations depicted in FIGS. 2, 3, and 4 can be used. A global attribute counter is a mechanism for distinguishing index entries which were inserted before a point in time determined by the global attribute counter from index entries that were newly inserted thereafter (the index entries are tagged with an attribute indicator). By using another global attribute counter, another grouping of index entries related to another attribute can be identified. For example, to identify those index entries that are 'committed' (that is, index entries that in some sense are fully processed and not undoable from those index entries that are not fully processed), a second global attribute counter (that is, a 'committedness' global attribute counter) and a committedness attribute indicator can be included and the operations of FIGS. 2, 3, 4, and 5 can be adapted to accommodate the 'committedness' global attribute counter and the 'committedness attribute indicators tagged to their respective index entries.

An attribute manager module 106 manages attribute indicators or flags which are tagged or coupled to corresponding index entries (an index entry is a key or key data value which has been inserted into an index). Page counters are associated with corresponding target pages (a target page is a convenient segment or portion of the index 104). A global attribute counter 108 is associated with the attribute indicators. An attribute indicator marks, tags, identifies, or indicates an attribute or property of an index entry. For example, an attribute indicator can indicate that an index entry is inaccessible to other users (naturally, this excludes the user who actually inserted the index entry). A page counter value increases each time a corresponding target page is manipulated, such as when a key is entered into a corresponding target page. A key is entered or inserted into an index, and the newly inserted index entry is tagged with an attribute that indicates that the attribute-tagged index entry may have a particular attribute (for example, it is 'invisible') If a page counter value (associated with a corresponding target page which contains the newly inserted index entry) is greater than or equal to the value of a global attribute counter 108, the newly inserted key data value is considered not accessible to other users. If a newly inserted index entry is marked as pseudo-inserted (inserted but not yet available for access) and a page counter value (associated with a corresponding target page having the newly inserted key data value) is less than the value of a global attribute counter 108, the newly inserted key data value is marked as accessible to other users. By choosing or selecting a value for a global attribute counter 108, the attribute (such as accessibility of a newly inserted index entries) may be manipulated or determined. In a preferred embodiment of the invention, a page log sequence number (LSN) is conveniently used as the page counter. LSNs are known in the art. Removal of attribute flags is done in a lazy fashion. Whenever a target page is updated, unwanted attribute indicators or flags can be cleared.

Figure 2:
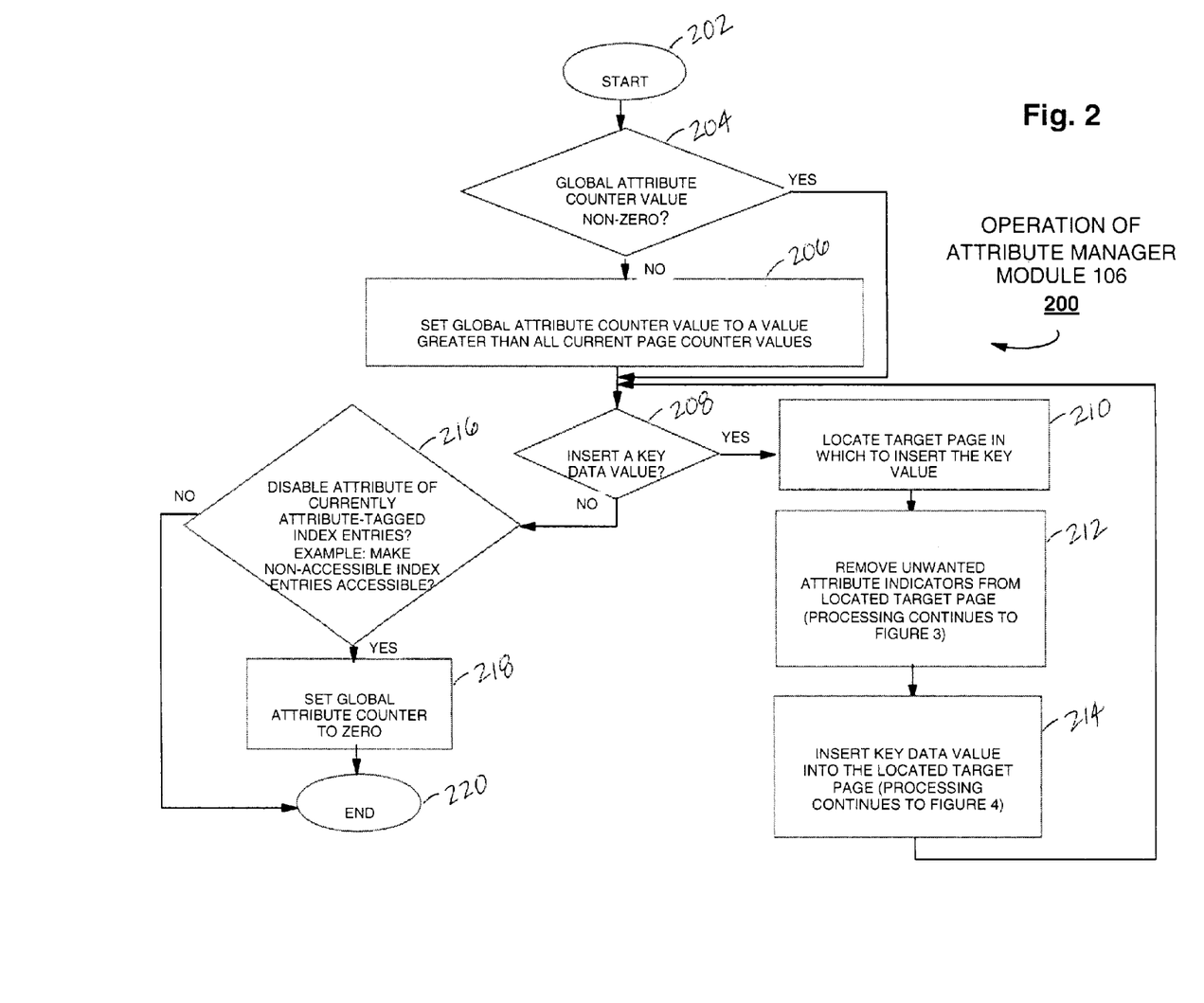
FIG. 2 depicts an operation performed by the attribute manager module of FIG. 1.

FIG. 2 shows operation 200 of attribute manager module 106 of FIG. 1, in which operation 200 generally directs data processing system 100 to manage an index containing attribute-tagged index entries. It is understood that operation 200 is performed by attribute manager module 106 unless otherwise specified.

Attribute manager module 106 commences (operation 202). Attribute manager module 106 determines whether the global attribute counter 108 contains a non-zero value (operation 204). If the current value of global attribute counter 108 is non-zero, operation 206 is bypassed and processing continues to operation 208. If the global attribute counter is already set, then the attribute associated with the counter is still active for previously inserted keys. Resetting the counter to a new value greater than the page counter value would disable the attribute. For example, in the case of the 'invisibility' attribute, if the previous insertion did not reset the count (see operation 218), then it wanted to leave invisible keys in the index. Changing the global attribute indicator to a value greater than the page counter value would make them visible prematurely. By leaving the counter alone we can insert more keys while keeping the old keys invisible, and defer the materialization of both sets for later. If the current value of global attribute counter 108 is non-zero, processing continues to operation 208. A non-zero value for the global attribute counter 108 indicates that the index attributes may apply. For example, some index entries are currently tagged with an inaccessibility attribute indicator which prevents users from accessing the inaccessibility-tagged index entries contained in the index 104. The inaccessibility-tagged (that is, pseudo-inserted) index entries can be located in several target pages or portions of the index 104.

If global attribute counter 108 contains a zero value, attribute manager module 106 sets the value of the global attribute counter 108 to a value which is greater than a current value of any page counter (operation 206). By setting the global attribute counter to a value greater than the current value of any page counter, this ensures that no page will initially contain any index entries tagged with a valid (that is, enabled) attribute indicator. The pages may contain attribute indicators, but because the page counter is less than the global counter, the attribute indicators will be ignored. For example, consider a page with keys tagged as 'inaccessible' and with page counter set to a value of 500. If the global attribute counter is set to a value of 501, the inaccessibility attribute indicators are ignored for that page of the index 104 and therefore the index entries are accessible. By setting the global attribute counter 108 greater than the largest valued page counter, all of the attribute-tagged index entries on all pages are accessible.

Attribute manager module 106 determines whether there are more key values to be inserted into an index 104 (operation 208). If there are no more key data values to be inserted into the index 104, processing continues to operation 216. If there is another key data value to be inserted into the index 104, processing continues to operation 210.

Attribute manager module 106 locates a target page contained in the index 104 in which to insert a key data value (operation 210). Attribute manager module 106 performs an operation for removing attribute indicators from the located target page (operation 212). This was identified previously as the lazy scrubbing operation for removing attribute indicators from a target page. For this case, processing continues to operation 300 shown in FIG. 3. Further details regarding operation 212 are provided in the description of operation 300. Once operation 300 is completed, processing returns to operation 214.

Figure 4:
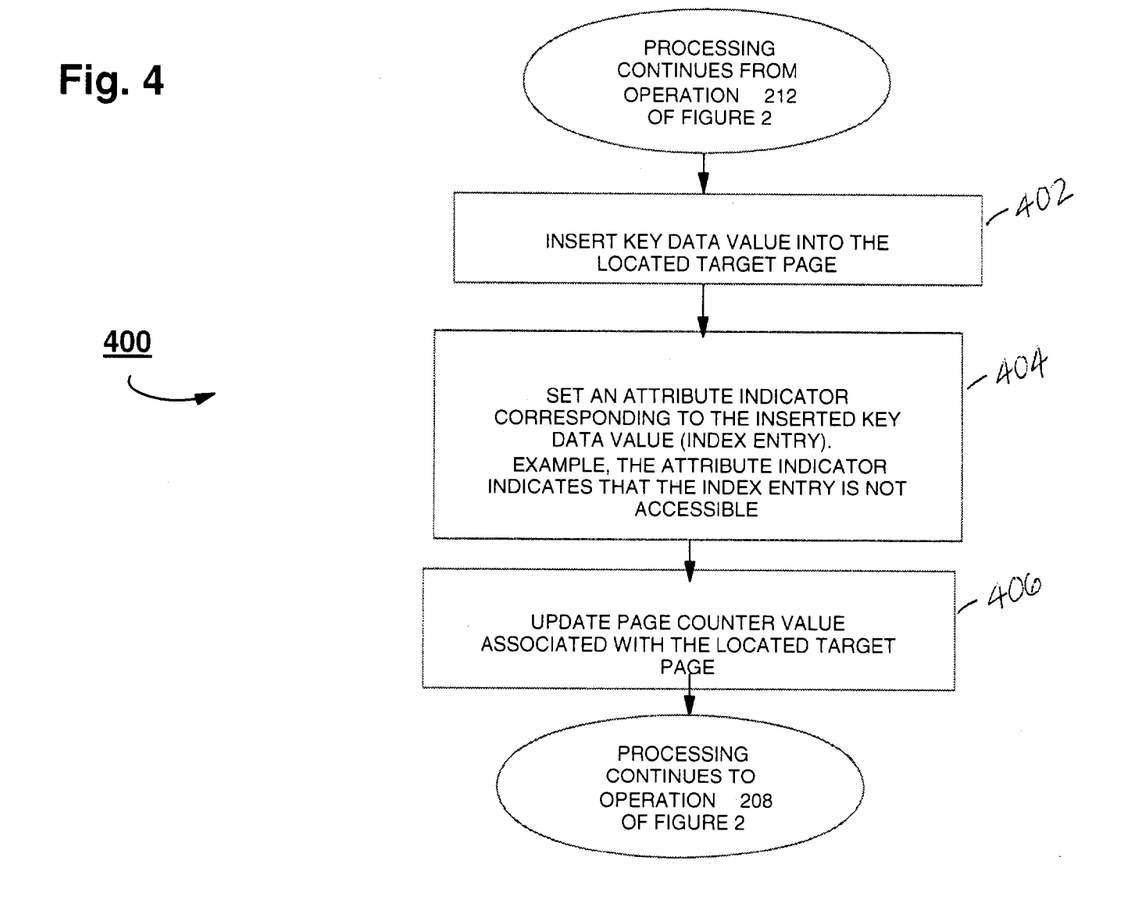
FIG. 4 depicts yet another operation performed by the attribute manager module of FIG. 1.

Attribute manager module 106 inserts a key data value into the located target page and thereby the target page now contains a new index entry (operation 214), in which case processing continues to operation 400 of FIG. 4. Further details of operation 214 are provided in the description of operation 400. Once operation 400 is completed, processing returns to operation 208. Attribute manager module 106 determines once again whether there are any other key data values to be inserted into index 104 (operation 208). If no other key data values are to be inserted, processing continues to operation 216. If additional key data values are to be inserted into a target page, operations 210 to 214 are iteratively processed or repeated for each additional key data value to be inserted into target pages of index 104.

Attribute manager module 106 determines whether to disable attribute indicators so that a specific operation or purpose can be enabled, for example such as enabling accessibility to attribute-tagged index entries (that is, key data values which were inserted by the user) which are currently marked or tagged with an attribute indicator to indicate accessibility of an index entry (operation 216). Attribute manager module 106 provides this operation for disabling (that is, revoking) the attribute in a global manner (that is, for all attribute-tagged index entries). The attributes are revoked or disabled in 'bulk' in this operation. The operation of revoking the attribute does not restrict access to other non-attribute-tagged index entries. The revocation of an attribute can be made to happen quickly by setting the global attribute counter to zero or by setting the global attribute counter to a value greater than the value of all page counters. It may be desirable to defer revocation of the attribute to a later time. For example, it is desirable to maintain the attribution of attribute-tagged index entries (such as 'accessible') until a later time so that further batches of newly inserted index entries can happen; thus all batches are enabled for inaccessible attribution and can be disabled for accessible attribution en mass. If attribution is to be revoked, processing continues to operation 218. If it is desired to maintain attribution (that is, not revoke attribution), processing continues to operation 220 (in which case operation of attribute manager module 106 stops).

Attribute manager module 106 sets a current value of global attribute counter 108 to zero to indicate that the attribution of attributed-tagged index entries are to be ignored (operation 218). Once the attribution is ignored, processing continues to operation 220 (in which case operation of attribute manager module 106 stops). Of course, the setting of the global attribute counter will only impact the particular attribute associated with that global attribute counter (other attributes are affected by other global attribute counters).

Figure 3:
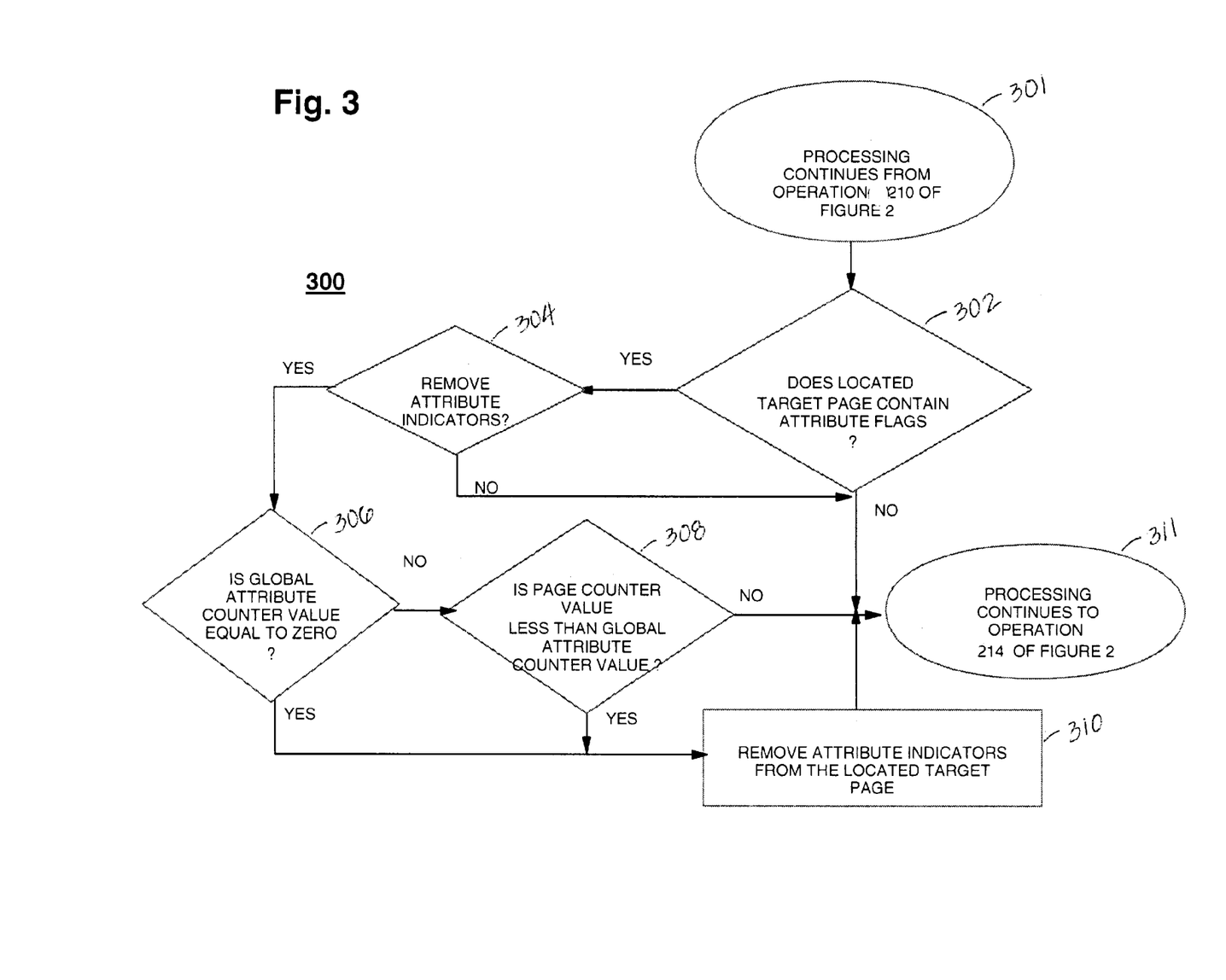
FIG. 3 depicts another operation performed by the attribute manager module of FIG. 1.

FIG. 3 shows operation 300, performed by attribute manager module 106 of FIG. 1, for removing an attribute indicator from an index, which also includes operation for untagging the attribute indicator tagged with an index entry contained in the index. Operation 300 includes operation for the lazy scrubbing of attribute keys. Operation 300 makes the page a clean-slate for attribute indicators (if it needs to) before the page is updated in operation 400 of FIG. 4.

Processing proceeds to operation 302 from operation 210 of FIG. 2. After locating the target page but before actually inserting the key data value in the located target page, the attribute manager module 106 determines whether the located target page contains any attribute indicators, for example such as an accessibility indicator or flag (operation 302). If the located target page contains any attribute indicators associated with the global attribute counter, processing continues to operation 304. If the located target page does not contain any attribute indicators (which means that the located target page contains no attribute-tagged index entries), processing continues to operation 214 of FIG. 2 in which the key data value is inserted in to the located target page according to operation 214.

Attribute manager module 106 determines whether to remove attribute indicators from the located target page before inserting the key data value into the located target page (operation 304). Whenever a page is updated, operation is provided for attempting to remove attribute indicators. If there is no need to remove any attribute indicators from the located target page, processing continues to operation 214 of FIG. 2 which includes operation for inserting the key data value into the located target page. It can be appreciated that operation does not need to return to FIG. 2; alternatively, operation 300 shown in FIG. 3 could be included in any updater which operates independently of operation 200 shown in FIG. 2. If there is a need to remove attribute indictors (which are associated with the global attribute indicator) from the located targeted page, processing continues to operations 306, 308, and possibly operation 310 (depending on the outcomes of operations 306 and 308).

Before a key data value is to be inserted into a page of index 104 (and tagged with attribute identifiers), it may be necessary to attempt to remove older attribute indicators from the located target page. A decision is then made as to whether to remove the attribute indicators or not to remove them before inserting new index entries that will be tagged with an attribute indicator. If an index entry is tagged with a given attribute indicator and if, because of the values of the page counter and the global counter associated with the given attribute indicator, the attribute indicators are ignored (disabled attribution), then changing the value of the page counter could make those attribute indicators active again (enabled attribution). For example, consider a page with an attribute-tagged index entry 'A#' inserted on a page associated with a page counter having a value of '200', and where the global attribute counter for that attribute has a value set to '300' and let '#' denote the attribution indicator for 'pseudo-inserted' index entries. Because the global attribute counter has a value larger than the page counter, the attribute indicator '#' is ignored and the attribute-tagged index entry is attribution disabled (for example, the attribute-tagged index entry is 'accessible'). However, as soon as another index entry 'B#' is inserted to the page, the page counter is updated to another larger value (for example, '400'), and 'A#' becomes 'inaccessible' again (attribution enabled). To avoid this case, operation is provided for removing, wiping, or scrubbing the attribute indicators '#' from the attribute-tagged index entries of the target page before another index entry 'B#' is inserted, and the page counter is updated to a value of '400'. In operation 304, it is determined that a user requested a desire to remove attribute indicators from the located target page. In operation 306, attribute manager module 106 determines whether the current value of global attribute counter 108 is equal to zero. A zero value in the global attribute counter 108 means that all attribute indicators associated with the global counter (which are tagged to some index entries) can be removed. A non-zero value in the global attribute counter 108 means that there may be some attribute-tagged index entries in the located target page but that the attribute indicators may not have to be removed quite yet. It will be appreciated that a non-zero global attribute counter has no influence on what attribute indicators are on the page. It simply means that the attribute indicators are processed. If the global attribute counter 108 is zero, the attribute indicators are ignored (disabled). If the current value of global attribute counter 108 is equal to zero, processing continues to operation 310, in which case the attribute indicators associated with the located target page are removed. If the current value of global attribute counter value 108 is not equal to zero, processing continues to operation 308.

Attribute manager module 106 determines whether a current value of a page counter (which is associated with the located target page) is less than the current value of the global attribute counter 108 (operation 308). Alternatively, any application that updates the page such as a page updater could make this determination. If the current value of the page counter is less than the current value of the global attribute counter 108, this means that the attributes no longer apply and should be removed, and processing continues to operation 222. If the current value of the page counter is not less than the current value of the global attribute counter 108, this means that the attributes on the page still apply, processing continues to operation 214 of FIG. 2. It can be appreciated that operation does not need to return to FIG. 2; alternatively, operation 300 shown in FIG. 3 could be included in any updater which operates independently of operation 200 shown in FIG. 2.

Attribute manager module 106 removes all attribute indicators from the located target page, and processing continues to operation 214 of FIG. 2 (operation 310). Alternatively, operation 300 can be entirely performed by an updater module which operates independently of the attribute manager module 106. If the updater module is performing operation 300, operation 301 and 311 indicate the beginning and end of operation for removing unwanted attribute identifiers.

FIG. 4 depicts operation 400, performed by attribute manager module 106 of FIG. 1, for inserting a key having an attribute indicator into the index. It is understood that operation 400 is performed by the attribute manager module 106 of FIG. 1 unless stated otherwise. Operation 400 includes code operations for tagging (or associating) a key data value with an attribute indicator. Processing proceeds to operation 402 from operation 214 of FIG. 2.

The page counter is updated to a value greater than or equal to the global attribute counter. This indicates that the attribute indicators on this page do apply. The page counter value need not be changed if the value is already greater than or equal to the global attribute counter 108.

Attribute manager module 106 inserts a key data value into a located target page as identified in operation 210 of FIG. 1 (operation 402). The inserted key data value now becomes an index entry. Attribute manager module 106 sets an attribute indicator or flag (such as for example, an accessibility flag), which is tagged or associated with the newly inserted index entry (operation 404). For example, the attribute indicator can indicate that the inserted index entry is not accessible by other users. Attribute manager module 106 updates a value of a page counter associated with the located target page (operation 406). Once the value of the page counter has been updated, processing continues to operation 208 of FIG. 2. The value of the page counter must be set to a value larger than or equal to the global attribute counter. This is so that the attribute flags on this page apply.

Figure 5:
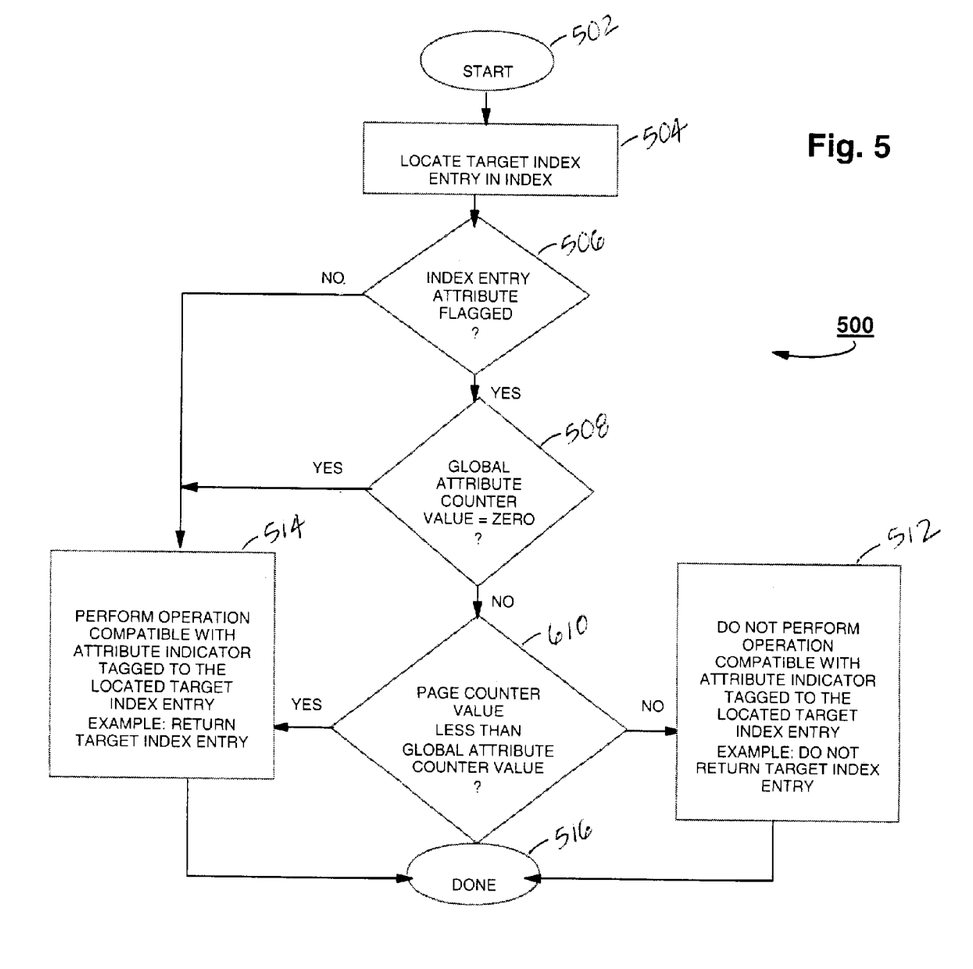
FIG. 5 depicts operation of the index query module of FIG. 1.

FIG. 5 depicts operation 500 of index query module 110 of FIG. 1. Operation 500 includes operations for determining whether to perform an operation compatible with an attribute indicator tagged to an index entry. It will be understood that operation 500 is performed by the index query module 110 unless specified otherwise. Operation of index query module 110 begins (operation 502).

Index query module 110 locates or finds a target index entry as requested by a user (operation 504). This operation is known in the prior art.

Index query module 110 determines whether the located target index entry is flagged or tagged with an attribute indicator (such as a non-accessibility attribute indicator which indicates that the located tagged index entry is not accessible to users) (operation 506). If the located target index entry is not tagged with an attribute indicator, processing continues to operation 514. If the located target index entry is tagged with an attribute indicator, processing continues to operation 508.

Index query module 110 determines whether a current value of the global attribute counter 108 is set to a zero value (operation 508). If the global counter value contains a zero value that means that the attributes should be ignored. If the global counter value contains a non-zero value it must be determined whether the attribute applies. If the global counter value contains a non-zero value, processing continues to operation 510. If the global counter value contains a zero value, processing continues to operation 514.

Index query module 110 determines whether the current value of the page counter associated with a target page is less than the current value of the global attribute counter value 108 (operation 510). If the current value of the page counter is not less than the current value of the global attribute counter 108, processing continues to operation 512. If the current value of the page counter is less than the current value of the global attribute counter 108, processing continues to operation 514. Essentially this test is used to determine whether an attribute-tagged index entry belongs to a group with the certain attribute active or not. If the page counter is larger than or equal to the global attribute counter and the index entry is tagged with an attribute indicator, the attribute-tagged index entry really has that attribute. In the example given in FIG. 1, in page 114B, the index entry 'C#' has just been inserted and it is flagged as having the 'pseudo-inserted' attribute. The attribute indicator alone does not determine whether the attribute-tagged index entry is inaccessible to the index query module 110. Because the page counter is larger than the global attribute counter 108, however, the attribute-tagged index entry 'C#' is inaccessible to the index query module 100. If the page counter had a value of '100', 'C#' would be accessible.

Index query module 110 does not perform an operation that is compatible with the attribution associated with the attribute indicator tagged to the index entry (operation 512). For example, index query module 110 skips the located target index entry (because the attribute-tagged index entry is not accessible), and processing continues to operation 516 in which the operation of index query module 100 stops.

Index query module 110 may perform an operation that is compatible with the attribution associated with the attribute indicator tagged to the index entry (operation 514). For example, the index query module 110 may return the located target index entry where the attribution of 'accessibility' has been disabled, and processing continues to operation 516 at which the operation of the index query module 100 stops.

The present invention may be embodied in other specific forms without departing from the spirit or essential characteristics thereof. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A method for managing an index in a data processing system, the method comprising:

inserting a first key value into a first new index entry of a target page, the target page being one of a plurality of pages of the index, each page of the index being associated with a page counter;

assigning a first attribute indicator to the first new index entry, the first attribute indicator indicating a first type of attribute;

setting a first global counter provided for the first type of attribute to be greater than zero responsive to the first global counter being equal to zero;

updating the page counter associated with the target page to be greater than or equal to the first global counter responsive to the page counter associated with the target page being less than the first global counter, the first attribute indicator assigned to the first new index entry being enabled responsive to the first global counter being greater than zero and being less than or equal to the page counter associated with the target page; and not performing a first operation on the first new index entry responsive to the first attribute indicator assigned to the first new index entry being enabled.

2. The method of claim 1, further comprising:

setting the first global counter to zero or updating the first global counter to be greater than the page counter associated with the target page to disable the first attribute indicator assigned to the first new index entry, wherein all attribute indicators assigned to one or more other index entries of the target page that indicate the first type of attribute are also disabled responsive to the first global counter being set to zero or being updated to be greater than the page counter associated with the target page, and wherein all attribute indicators assigned to one or more index entries of one or more other pages of the index that indicate the first type of attribute are also disabled responsive to the first global counter being set to zero.

3. The method of claim 2, further comprising:
performing a second operation on the first new index entry responsive to the first attribute indicator assigned to the first new index entry being disabled.

4. The method of claim 1, further comprising:
assigning a second attribute indicator to the first new index entry, the second attribute indicator indicating a second type of attribute;
setting a second global counter provided for the second type of attribute to be greater than zero responsive to the second global counter being equal to zero; and
updating the page counter associated with the target page to be greater than or equal to the second global counter responsive to the page counter associated with the target page being less than the second global counter,
the second attribute indicator assigned to the first new index entry being enabled responsive to the second global counter being greater than zero and being less than or equal to the page counter associated with the target page.

5. The method of claim 4, further comprising:
setting the second global counter to zero or updating the second global counter to be greater than the page counter associated with the target page to disable the second attribute indicator assigned to the first new index entry,
wherein all attribute indicators assigned to one or more other index entries of the target page that indicate the second type of attribute are also disabled responsive to the second global counter being set to zero or being updated to be greater than the page counter associated with the target page, and
wherein all attribute indicators assigned to one or more index entries of one or more other pages of the index that indicate the second type of attribute are also disabled responsive to the second global counter being set to zero.

6. The method of claim 1, further comprising:
prior to inserting a second key value into a second new index entry of the target page, removing the first attribute indicator assigned to the first new index entry responsive to the first global counter being equal to zero or being greater than the page counter associated with the target page.

7. The method of claim 1, further comprising:
maintaining read access to the index while inserting the first key value into the first new index entry of the target page.

8. The method of claim 1, further comprising:
deferring integrity validation of the first new index entry.

9. The method of claim 1, further comprising:
enabling independent insertions of key values into the index by a plurality of applications.

10. The method of claim 1, wherein the first type of attribute is an inaccessibility attribute or a committedness attribute.

11. The method of claim 1, wherein the page counter associated with the target page is a log sequence number.

12. A computer readable storage medium encoded with a computer program for managing an index in a data processing system, the computer program comprising instructions for:
inserting a first key value into a first new index entry of a target page, the target page being one of a plurality of pages of the index, each page of the index being associated with a page counter;
assigning a first attribute indicator to the first new index entry, the first attribute indicator indicating a first type of attribute;
setting a first global counter provided for the first type of attribute to be greater than zero responsive to the first global counter being equal to zero;
updating the page counter associated with the target page to be greater than or equal to the first global counter responsive to the page counter associated with the target page being less than the first global counter,
the first attribute indicator assigned to the first new index entry being enabled responsive to the first global counter being greater than zero and being less than or equal to the page counter associated with the target page; and
not performing a first operation on the first new index entry responsive to the first attribute indicator assigned to the first new index entry being enabled.

13. The computer readable storage medium of claim 12, wherein the computer program further comprises instructions for:
setting the first global counter to zero or updating the first global counter to be greater than the page counter associated with the target page to disable the first attribute indicator assigned to the first new index entry,
wherein all attribute indicators assigned to one or more other index entries of the target page that indicate the first type of attribute are also disabled responsive to the first global counter being set to zero or being updated to be greater than the page counter associated with the target page, and
wherein all attribute indicators assigned to one or more index entries of one or more other pages of the index that indicate the first type of attribute are also disabled responsive to the first global counter being set to zero.

14. The computer readable storage medium of claim 13, wherein the computer program further comprises instructions for:
performing a second operation on the first new index entry responsive to the first attribute indicator assigned to the first new index entry being disabled.

15. The computer readable storage medium of claim 12, wherein the computer program further comprises instructions for:
assigning a second attribute indicator to the first new index entry, the second attribute indicator indicating a second type of attribute;
setting a second global counter provided for the second type of attribute to be greater than zero responsive to the second global counter being equal to zero; and
updating the page counter associated with the target page to be greater than or equal to the second global counter responsive to the page counter associated with the target page being less than the second global counter,
the second attribute indicator assigned to the first new index entry being enabled responsive to the second global counter being greater than zero and being less than or equal to the page counter associated with the target page.

16. The computer readable storage medium of claim 15, wherein the computer program further comprises instructions for:
setting the second global counter to zero or updating the second global counter to be greater than the page counter associated with the target page to disable the second attribute indicator assigned to the first new index entry, wherein all attribute indicators assigned to one or more other index entries of the target page that indicate the second type of attribute are also disabled responsive to the second global counter being set to zero or being updated to be greater than the page counter associated with the target page, and wherein all attribute indicators assigned to one or more index entries of one or more other pages of the index that indicate the second type of attribute are also disabled responsive to the second global counter being set to zero.

17. The computer readable storage medium of claim 12, wherein the computer program further comprises instructions for:

prior to inserting a second key value into a second new index entry of the target page, removing the first attribute indicator assigned to the first new index entry responsive to the first global counter being equal to zero or being greater than the page counter associated with the target page.

18. The computer readable storage medium of claim 12, wherein the computer program further comprises instructions for:

maintaining read access to the index while inserting the first key value into the first new index entry of the target page.

19. The computer readable storage medium of claim 12, wherein the computer program further comprises instructions for:

deferring integrity validation of the first new index entry.

20. The computer readable storage medium of claim 12, wherein the computer program further comprises instructions for:

enabling independent insertions of key values into the index by a plurality of applications.

21. The computer readable storage medium of claim 12, wherein the first type of attribute is an inaccessibility attribute or a committedness attribute.

22. The computer readable storage medium of claim 12, wherein the page counter associated with the target page is a log sequence number.

23. A data processing system comprising:

a memory operatively coupled to a central processing unit;

an index stored in the memory; and one or more modules stored in the memory, the one or more modules being operable to manage the index and to direct the central processing unit to:

insert a first key value into a first new index entry of a target page, the target page being one of a plurality of pages of the index, each page of the index being associated with a page counter, assign a first attribute indicator to the first new index entry, the first attribute indicator indicating a first type of attribute, set a first global counter provided for the first type of attribute to be greater than zero responsive to the first global counter being equal to zero, update the page counter associated with the target page to be greater than or equal to the first global counter responsive to the page counter associated with the target page being less than the first global counter, the first attribute indicator assigned to the first new index entry being enabled responsive to the first global counter being greater than zero and being less than or equal to the page counter associated with the target page, and not perform a first operation on the first new index entry responsive to the first attribute indicator assigned to the first new index entry being enabled.

24. The data processing system of claim 23, wherein the one or more module are further operable to direct the central processing unit to:

set the first global counter to zero or updating the first global counter to be greater than the page counter associated with the target page to disable the first attribute indicator assigned to the first new index entry, wherein all attribute indicators assigned to one or more other index entries of the target page that indicate the first type of attribute are also disabled responsive to the first global counter being set to zero or being updated to be greater than the page counter associated with the target page, and wherein all attribute indicators assigned to one or more index entries of one or more other pages of the index that indicate the first type of attribute are also disabled responsive to the first global counter being set to zero.

25. The data processing system of claim 24, wherein the one or more module are further operable to direct the central processing unit to:

perform a second operation on the first new index entry responsive to the first attribute indicator assigned to the first new index entry being disabled.

26. The data processing system of claim 23, wherein the one or more module are further operable to direct the central processing unit to:

assign a second attribute indicator to the first new index entry, the second attribute indicator indicating a second type of attribute;

set a second global counter provided for the second type of attribute to be greater than zero responsive to the second global counter being equal to zero; and update the page counter associated with the target page to be greater than or equal to the second global counter responsive to the page counter associated with the target page being less than the second global counter, the second attribute indicator assigned to the first new index entry being enabled responsive to the second global counter being greater than zero and being less than or equal to the page counter associated with the target page.

27. The data processing system of claim 26, wherein the one or more module are further operable to direct the central processing unit to:

set the second global counter to zero or updating the second global counter to be greater than the page counter associated with the target page to disable the second attribute indicator assigned to the first new index entry, wherein all attribute indicators assigned to one or more other index entries of the target page that indicate the second type of attribute are also disabled responsive to the second global counter being set to zero or being updated to be greater than the page counter associated with the target page, and wherein all attribute indicators assigned to one or more index entries of one or more other pages of the index that indicate the second type of attribute are also disabled responsive to the second global counter being set to zero.

28. The data processing system of claim 23, wherein the one or more module are farther operable to direct the central processing unit to:

prior to insertion of a second key value into a second new index entry of the target page, remove the first attribute indicator assigned to the first new index entry responsive to the first global counter being equal to zero or being greater than the page counter associated with the target page.

29. The data processing system of claim 23, wherein the one or more module are further operable to direct the central processing unit to:

maintain read access to the index while inserting the first key value into the first new index entry of the target page.

30. The data processing system of claim 23, wherein the one or more module are farther operable to direct the central processing unit to:

defer integrity validation of the first new index entry.

31. The data processing system of claim 23, wherein the one or more module are farther operable to direct the central processing unit to:

enable independent insertions of key values into the index by a plurality of applications.

32. The data processing system of claim 23, wherein the first type of attribute is an inaccessibility attribute or a committedness attribute.

33. The data processing system of claim 23, wherein the page counter associated with the target page is a log sequence number.

* * * * *